May 12, 1925.
C. S. JENNER
FRUIT PREPARING TOOL
Filed Oct. 13, 1924
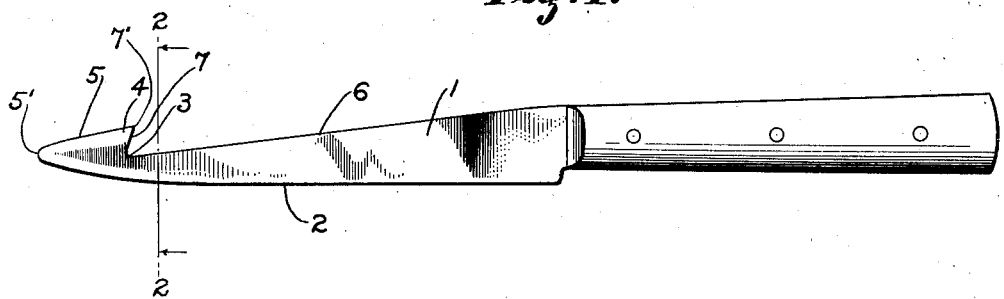
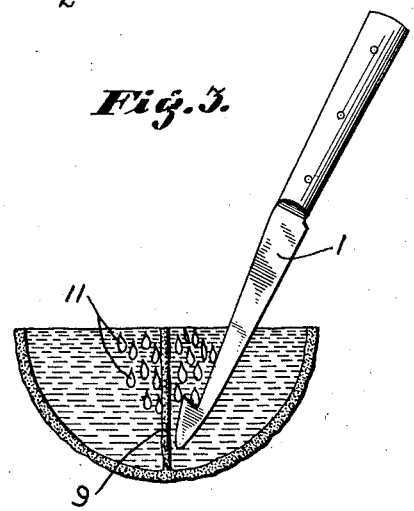
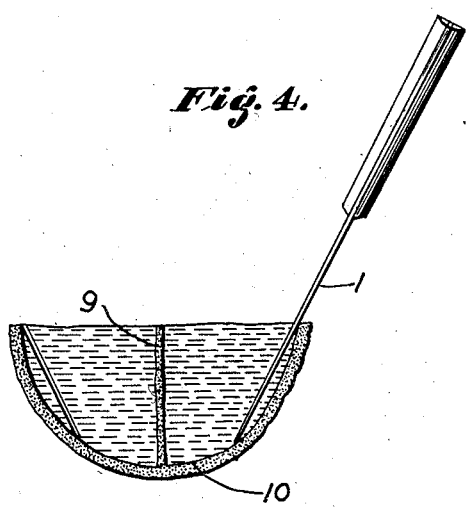
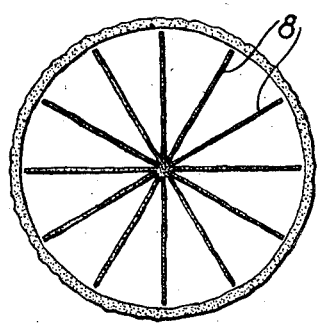
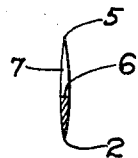
Inventor.
Charles S. Jenner.
By
Dewey, Strong, Townsend & Loftus
Attorneys.

Patented May 12, 1925.

1,537,308

UNITED STATES PATENT OFFICE.

CHARLES S. JENNER, OF SAN FRANCISCO, CALIFORNIA.

FRUIT-PREPARING TOOL.

Application filed October 13, 1924. Serial No. 743,302.

*To all whom it may concern:*

Be it known that I, CHARLES S. JENNER, a citizen of the United States, residing at the city and county of San Francisco, and State of California, have invented new and useful Improvements in Fruit-Preparing Tools, of which the following is a specification.

This invention relates to a fruit preparing tool, and particularly to a tool for preparing grape fruit, oranges, and the like.

The best flavored grape fruit have seeds, and also a thick, bitter tasting fiber dividing the segments of pulp. Many people refrain from serving grape fruit because of the difficulty in preparing them. If the entire seeded center is cut out and the remaining pulp slashed, so that pieces may be lifted with a spoon, much of the pulp is wasted. Also one is forced to eat the fiber with the pulp, and it is very bitter. If this is not done, and an attempt is made to eat the grape fruit with a spoon without preparation, the juice squirts outwardly in a very disagreeable and well known manner. The object of my invention is to provide a tool with which the fruit can be quickly prepared, leaving the same entirely seedless and edible without any of the usual disagreeable features.

In the accompanying drawing I have shown one specific embodiment of my invention, but it will be understood that such embodiment can be modified within the scope of the appended claims, without departing from the spirit of my invention.

Referring to the figures of the drawing:

Fig. 1 is a side elevation of my improved tool.

Fig. 2 is a sectional view taken on line 2—2 of Fig. 1.

Fig. 3 is a view showing the tool in use.

Fig. 4 is another view showing the tool in use.

Fig. 5 is a plan view of a half portion of fruit as prepared by my improved tool.

As illustrated in Fig. 1, my improved tool comprises a knife having a long, slender blade 1, this blade being straight, i. e., not curved in the plane perpendicular to the flat of the blade. The front edge 2 is sharpened and a deep notch 3 is formed in the rear edge of the blade to provide a hook 4 adjacent the point thereof. The edge 5 between the hook and the point 5' is also sharpened for the purpose hereinafter described. The extreme end 5' of the blade is of rounded outline rather than needle pointed and is sharp edged so that there is a continuous sharp cutting edge extending from the handle along the cutting edge 2, around the extreme end of the blade, and along the edge 5 to and including the extreme point 7' of the hook. The backwardly extending point 7' of the hook is sharpened to a needle point. The rear edge 6 of the blade and the edge 7 of the hook are preferably not sharpened.

This tool is adapted to perform every operation of preparing grape fruit, oranges, and the like. Such operations and the adaptability of the different portions of the tool thereto will now be specifically described.

The fruit is first severed into two halves by means of the edge 2, the blade 1 being long enough for this purpose. The tool is next inserted into the fruit as shown in Fig. 3, with the hook pointing towards the center of the fruit, the hook being forced to a point beneath all the seeds 11 contained in each section. An upward movement of the tool will operate to lift the seeds from the fruit, all the seeds in a section usually coming out with one insertion of the tool. Should it be necessary to make two or more thrusts into a segment to remove all the seeds, such operation will not crush nor mash the pulp, since the sharp point 5' and sharp edges 2 and 5 adjacent the point of the tool make only sharp, radial cuts parallel to the juice-filled particles of pulp.

The seeds being removed from all the sections, the tool is next inserted as shown in Fig. 4, and the fruit is cut clear around the edge. The blade should clear the inner edge of the rind at the top and reach the rind at the bottom, without, however, actually cutting through the rind. After this operation, the fiber sections 8 are still firmly attached to the central core 9 and the pulp between such sections is free from the rind, except that the bottom of each segment of pulp at 10, which was purposely not cut through (as it would have been had a curved blade been used), is merely sufficient to keep the entire mass of pulp from turning around the central core 9. The fruit is now entirely prepared and ready for eating.

In eating the fruit, the spoon is thrust down one side of a segment with the top or flat of the bowl of the spoon against the fiber 8. The spoon is withdrawn and again inserted on the opposite side of the same segment, with the bottom or curve of the bowl next to the fiber. These operations entirely free the pulp at the sides from the fiber sections 8 and at the bottom 10 from the rind, and permit the pulp to be lifted out freely with the spoon as a continuation of the motion of making the second insertion of the spoon. It is obvious that no squirting of the juice can take place, and none of the fiber can come away with the pulp. Practically all of the juice is retained in and comes away with the pulp. When all of the pulp has been removed, the central core 9, with the attached fiber divisions 8, are left standing like the spokes around the hub of a wheel, as shown in Fig. 5.

A dull tool will crush and tear the delicate pulp, and therefore the entire cutting edge 2 should be kept sharp. The point 7' of the hook should be kept sharpened to a needle point. The three edges 5', 5 and 7 will usually require no resharpening unless badly blunted, nicked or upset in service.

Having thus described my invention, what I claim and desire to secure by Letters Patent is:

1. A fruit preparing tool comprising a long, slender blade having one cutting edge adapted to sever a fruit into halves and to cut around the pulp adjacent to, and concentrically with the rind, severing the pulp and radial fiber divisions from the rind, and a hook on the other edge of the blade adapted to remove the seeds from the severed halves, the transversely extending edge of the hook being blunt and unsharpened whereby to support the seeds thereon.

2. A fruit preparing tool comprising a long, straight blade having one cutting edge adapted to sever a fruit into halves, and to cut around the pulp adjacent to, and concentrically with the rind, severing the pulp and radial fiber divisions from the rind, and a hook on the other edge of the blade adjacent one end thereof adapted to remove the seeds from the severed halves, both edges of the blade forwardly of the hook being sharp whereby to avoid mutilating the pulp when inserting the knife thereinto to remove the seeds.

3. A fruit preparing tool comprising a long, slender blade having one cutting edge adapted to sever a fruit into halves and to cut around the pulp adjacent to, and concentrically with the rind, severing the pulp and radial fiber divisions from the rind, and a hook on the other edge of the blade adjacent one end thereof adapted to remove the seeds from the severed halves, and a handle on the other end of the blade, the hook extending outwardly from the blade at an acute angle thereto and toward the handle.

4. A fruit preparing tool comprising a long, slender blade, having one cutting edge adapted to sever a fruit into halves and to cut around the pulp adjacent to and concentrically with the rind, severing the pulp and radial fiber divisions from the rind, a sharp pointed hook on the other edge of the blade adjacent to the point thereof adapted to remove the seeds from the severed halves, and a handle on the other end of the blade, the hook extending outwardly from the blade at an acute agle thereto with the point extending backwardly toward the handle.

5. A fruit preparing tool comprising a long slender blade having one cutting edge adapted to sever a fruit into halves and to cut around the pulp adjacent to and concentrically with the rind, severing the pulp and radial fiber divisions from the rind, and a backwardly extending hook on the other edge of the blade adjacent to the point thereof adapted to remove the seeds from the severed halves, the point of the blade being blunt or rounded and the edges of this point and the knife edges extending rearwardly therefrom being sharp, whereby to avoid mutilating the pulp when inserting the knife thereinto to remove the seeds.

CHARLES S. JENNER.